Figure 1:
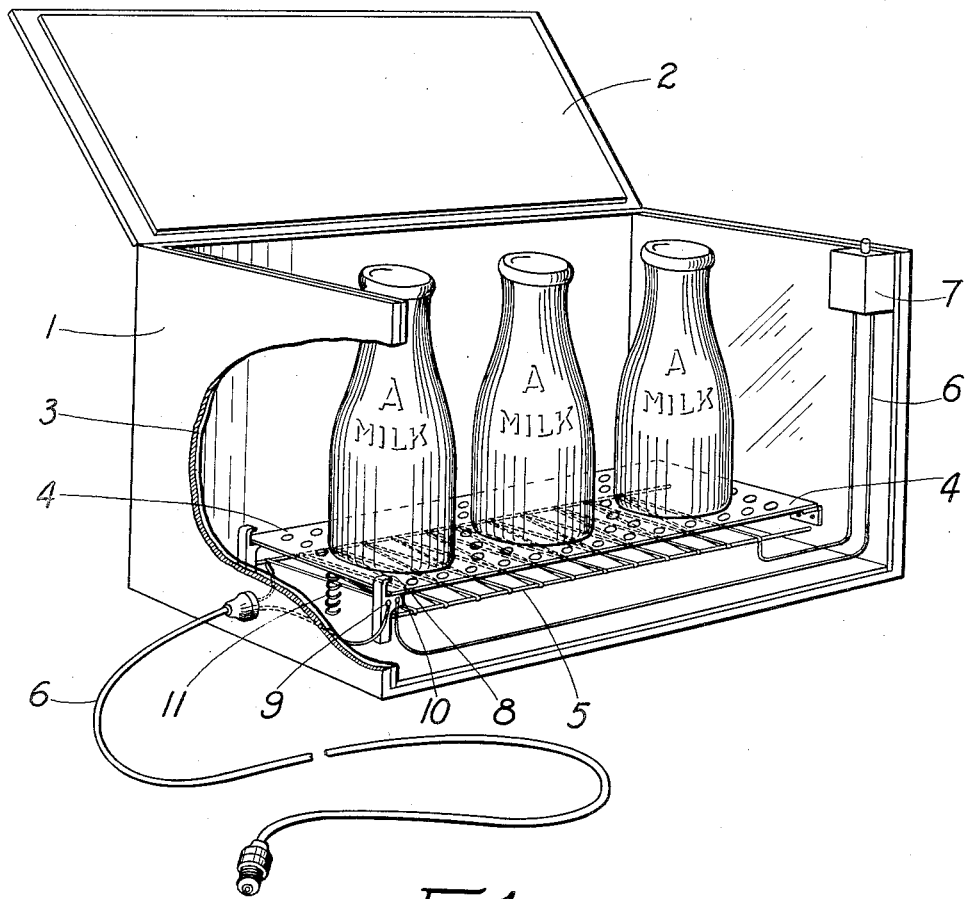

March 6, 1928.

W. W. AYRE 1,661,354

ANTIFREEZE CONTAINER

Filed March 17, 1927

WILLIAM W AYRE
INVENTOR.

BY Mason Fenwick & Lawrence
ATTORNEYS.

Patented Mar. 6, 1928.

1,661,354

UNITED STATES PATENT OFFICE.

WILLIAM W. AYRE, OF WEST ENGLEWOOD, NEW JERSEY.

ANTIFREEZE CONTAINER.

Application filed March 17, 1927. Serial No. 176,187.

My invention relates particularly to automatic means for preventing bottles of milk and similar articles, when left outside for cooling purposes, from freezing when the temperature falls below the freezing point.

To this end my invention consists primarily of a container to hold the bottle of milk or other article, an electric heating resistant in said container, and novel means whereby when the article is placed in the container the heater will be automatically placed in the electric circuit, will be automatically vitalized to keep the article from freezing when the temperature falls below the freezing point, will be automatically devitalized when the temperature rises above the freezing point, so as not to warm the article unduly, and will be automatically cut off from the electric circuit when there is no article in the container so as not to waste current.

In order that my invention may be fully understood I will first describe in detail the mode in which I at present prefer to carry the invention into practice and particularly point out the invention in the claim.

Reference is to be had to the accompanying drawing, forming part of this application, in which the figure is a perspective view showing an anti-freeze container embodying my invention.

In the drawing, 1 designates a container having a lid 2 to give access thereto, 3 designates a non-heat conducting insulation with which the container is preferably lined to retain natural warmth in the container, when closed, as far as possible.

In the bottom of the container is arranged a perforated horizontal shelf 4 on which the bottles of milk or other articles sensitive to freezing are placed, and below the reticulated shelf 4 is arranged, preferably parallel thereto, an electric heating grid 5 of any usual or desired resistant material, which is to be connected with an ordinary electric circuit 6, including and regulated automatically by a thermostatic circuit closer 7, fitted within the container.

To keep the circuit open only when an article is contained therein, I prefer to hinge the shelf 4 at one end to the end wall of the container, so that its free end can swing vertically between a stop 8 above it and a circuit closer 9, in the circuit, arranged in a shoulder 10 beneath the free end of the shelf, and provide a spring 11 beneath the free end of the shelf to hold the shelf, when not weighted with any article, away from the circuit closer 9 against the upper stop 8, and thus cut off and save all current when the container is not in use.

When a bottle of milk or other like article is placed on the shelf, its weight will depress the shelf against the spring 11, close the circuit, and vitalize the heater 5, and warm the interior of the container sufficiently to keep the sensitive article from freezing.

To cut off the current and devitalize the heater, when the temperature in the container rises materially above the freezing point, the thermostatic circuit closer 7 is adjusted to open the circuit when the temperature rises too high for the good of the contained article, and to close the circuit again when the temperature falls below the freezing point.

Milk or any other article sensitive to temperature can by this means be kept automatically as cool as desired, without any chance of freezing.

It is evident that the specific details of my invention herein shown and described, may be greatly varied without departing from the boundaries of my invention as defined by the following claim.

I claim as my invention—

Anti-freeze apparatus comprising a container and means for closing the same against the admission of air, an electric circuit, a circuit closer, means whereby the circuit closer is automatically operated by an article placed in the container, and a thermostatic circuit closer in said circuit arranged to break the circuit when the temperature in the container rises to a predetermined point, and to close the circuit when the temperature of the closed container falls to a predetermined point.

In testimony whereof he affixes his signature.

WILLIAM W. AYRE.